(Model.)
C. B. CLARK.
DOOR SPRING.
No. 244,184.          Patented July 12, 1881.
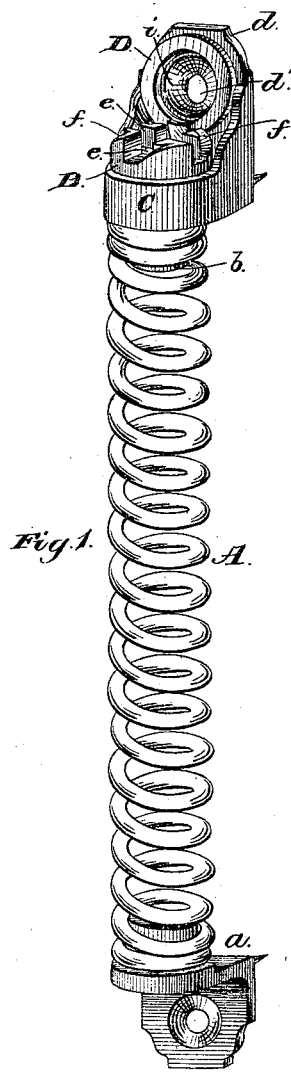
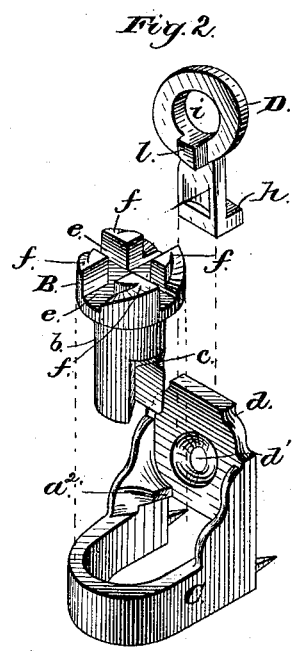
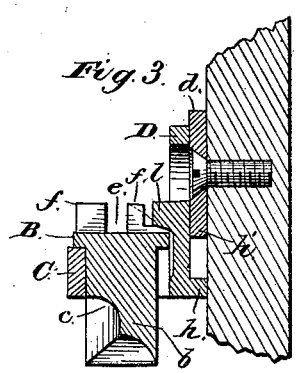
Witnesses:
Jas. E. Hutchinson.
J. A. Rutherford
Inventor:
Chas. B. Clark,
by James L. Norris.
Atty.
N. PETERS, Photo-Lithographer, Washington, D. C.

UNITED STATES PATENT OFFICE.

CHARLES B. CLARK, OF DETROIT, MICHIGAN, ASSIGNOR TO THE CLARK HARDWARE COMPANY, OF SAME PLACE.

DOOR-SPRING.

SPECIFICATION forming part of Letters Patent No. 244,184, dated July 12, 1881.

Application filed May 7, 1881. (Model.)

*To all whom it may concern:*

Be it known that I, CHARLES B. CLARK, a citizen of the United States, residing at Detroit, in the county of Wayne and State of Michigan, have invented new and useful Improvements in Door-Springs, of which the following is a specification.

This invention relates to that class of door and gate springs which have one end secured to or near the hinged edge of the door or gate and the other end to a part of the door-frame or to a post, the spring being under a torsional strain and serving to normally keep the door or gate in a closed position.

The object of this invention is to provide a door-spring in which the tension of the spring can be adjusted in an exceedingly simple manner by a ratchet-head and a gravitating locking pawl or dog without the necessity of separating the parts of the structure, and without liability of any of the parts becoming disengaged and lost. These objects I accomplish by the structure illustrated in the accompanying drawings, in which—

Figure 1 represents an elevation of my improved door-spring applied to a door; Fig. 2, detached perspective views of the top bracket, ratchet-head, and gravitating locking-pawl; and Fig. 3, a vertical sectional view through the top bracket, with the parts in proper relative position.

The letter A indicates a spiral spring, the lower end of which is coiled around and secured to the cylindrical stud of the bracket $a$ by any of the well-known means. The upper end of the spring is coiled around the cylindrical shank $b$ of the head B, and is permanently and rigidly connected therewith by depressing the end of the spring into a cavity, $c$, formed in said shank. The shank rests within a circular opening formed through the top bracket, C, and the latter is provided with a flat upward-projecting flange, $d$, having an aperture, $d'$, through which a screw can be passed for attaching it in place on the door-frame. The head B is extended laterally around its shank $b$, to form an annular shoulder or ledge, which rests on and is supported by the upper bracket, C, and the upper surface of the head is formed or provided with two angular grooves or recesses, $e$ $e$, which cross each other and extend transversely across the head, thereby forming four raised projections or teeth, $f$, the adjacent faces of which are square, while they are beveled or inclined downward at their outer margins, leaving at their inner margins or corners elevated lugs, and the whole constituting a ratchet-head capable of being rotated within the circular opening of the bracket C, for adjusting the tension of the coiled spring.

The letter D indicates the gravitating pawl or dog, which rests against the flat face of the flange $d$, and is provided at its lower end with a laterally-projecting lip, $h$, which serves to limit the vertical movement or displacement of the pawl by said lip coming in contact with the edge $h'$ of the bracket. The upper end of the pawl or dog is provided with an opening, $i$, the object of which is to permit the passage of the screw through the aperture $d'$ of the bracket in attaching the latter to the door-frame. This pawl or dog rests and slides upon the flange $d$ in rear of the ratchet-head B, and is provided with a tooth or pawl-shaped stop, $l$, which projects outward and engages the teeth of the ratchet-head, in order to lock or hold the same in its adjusted position; and in order to guide said pawl or dog in its movements and to sustain it against the torsion of the spring, the flange $d$ is provided with side projections, $a^2$, one on each side, which bear against the edges of the pawl.

The ratchet-head can be rotated to adjust the tension of the spring by simply inserting a pin, nail, or other instrument in one of the grooves $e$, and then swinging the pin or nail around.

It will be observed that in a door-spring possessing the construction described the simple rotation of the ratchet-head in the proper direction serves to automatically raise the pawl to permit a ratchet-tooth to pass by the same, and that said pawl falls by gravity into position behind the tooth for locking the ratchet-head in its adjusted position. By means of this gravitating pawl or dog it will therefore be evident that the rotary head is automatically locked in its adjusted position, whereby I avoid the employment of removable and replaceable locking-pins or collars usually employed in this class of springs, which are very objectionable, owing to the difficulty and inconvenience of manipulating them with the fingers and the liability of their becoming disengaged and lost.

A door-spring constructed in accordance with my invention is compact in form, simple in structure, and the parts, when once placed in operative position on a door, cannot become disengaged or separated.

While I have illustrated the ratchet-head as provided with two transverse grooves and four ratchet-teeth, it will, of course, be evident that this construction can be varied and more or less teeth employed as found necessary or desirable.

What I claim is—

1. In a door-spring, the combination of a ratchet-head rigidly connected with the end of a coiled spring and arranged to be rotated in a supporting-bracket with a gravitating pawl or dog arranged on said bracket and disconnected from the coiled spring, and arranged to automatically engage and disengage the ratchet-head to lock or hold the latter in its adjusted position, substantially as described.

2. A door-spring combining in its structure a ratchet-head rigidly connected with one end of the coiled spring and arranged to be rotated within a supporting-bracket, and a vertically-sliding pawl or dog arranged between the bracket and ratchet-head, and provided with a tooth or stop which automatically engages the ratchet-head to lock or hold it in its adjusted position, substantially as described.

3. In a door-spring, the ratchet-head arranged within the supporting-bracket, and provided with a shank rigidly connected with the end of the coiled spring, and having on its upper end the transverse grooves or recesses and inclined teeth, in combination with the gravitating pawl arranged between the bracket and the ratchet-head, and provided with a tooth or stop to engage the ratchet-head and with a lip to limit its upward movement, substantially as described.

In testimony whereof I have hereunto set my hand in the presence of two subscribing witnesses.

CHARLES B. CLARK.

Witnesses:
HENRY C. HART,
W. J. MILLER.